(12) United States Patent
Brawley

(10) Patent No.: US 12,181,182 B2
(45) Date of Patent: Dec. 31, 2024

(54) PORTABLE WATER DISPENSING SYSTEM

(71) Applicant: Tom Brawley, Conway, AR (US)

(72) Inventor: Tom Brawley, Conway, AR (US)

( * ) Notice: Subject to any disclaimer, the term of this patent is extended or adjusted under 35 U.S.C. 154(b) by 273 days.

(21) Appl. No.: 17/961,612

(22) Filed: Oct. 7, 2022

(65) Prior Publication Data
US 2024/0116746 A1 Apr. 11, 2024

(51) Int. Cl.
| | |
|---|---|
| F24H 1/06 | (2022.01) |
| A47K 3/28 | (2006.01) |
| B60R 15/02 | (2006.01) |
| B65D 25/40 | (2006.01) |

(52) U.S. Cl.
CPC ............... *F24H 1/06* (2013.01); *A47K 3/285* (2013.01); *B60R 15/02* (2013.01); *B65D 25/40* (2013.01)

(58) Field of Classification Search
CPC ........... A47K 3/285; B60R 15/02; F24H 1/06; F24H 1/009; B65D 25/40; B61D 35/002
See application file for complete search history.

(56) References Cited

U.S. PATENT DOCUMENTS

| | | | | |
|---|---|---|---|---|
| 4,651,862 A | * | 3/1987 | Greenfield, Jr. | ..... B67D 1/1297 222/2 |
| 5,251,345 A | * | 10/1993 | Pechner | ................. A47K 3/286 4/603 |

FOREIGN PATENT DOCUMENTS

| | | | |
|---|---|---|---|
| CN | 105342827 A | * | 2/2016 |
| DE | 102018006973 B3 | * | 12/2019 |

* cited by examiner

*Primary Examiner* — Paul R Durand
*Assistant Examiner* — Randall A Gruby
(74) *Attorney, Agent, or Firm* — David L. Gershner

(57) ABSTRACT

A portable water dispensing system which is configured to attach to a motor vehicle and may store and dispense potable water for the user. This system has a protective case for housing a water tank and pump unit and may also feature a cased water heater unit for dispensing water which has been heated above ambient temperature.

2 Claims, 8 Drawing Sheets

PORTABLE WATER DISPENSING SYSTEM

BACKGROUND OF THE INVENTION

The present invention is in the technical field of water storage and dispensing. More particularly, the present invention is in the technical field of portable water storage and dispensing units which may be mounted to a vehicle Overland travel has become an increasingly common event for recreational purposes and sometimes out of necessity. It involved traveling long distances often far civilization. A reliable water supply is a necessity for this type of travel. Currently available devices allow for storage of small amounts of water and do not provide a ready means of dispensing the water from the storage tank. Additionally, the available devices do not provide for a means to heat the water.

The present invention is a device which stores in water in a container which is secure and can be mounted to the exterior of a vehicle. Additionally, it provides a pump for use in dispensing the water and a removable water heater which can heat the stored water above ambient temperature.

SUMMARY OF THE INVENTION

The present invention is a device designed to be mounted to a vehicle and store and dispense clean water. The present invention is also designed to provide a water heater to warm the water being dispensed The advantages of the present invention include, without limitation, that it is simple to manufacture, simple in installation and operation, is substantially more secure in its attachment to a vehicle than existing devices, has a larger storage capacity than existing devices, and provides heating of the water.

BRIEF DESCRIPTION OF THE DRAWINGS

These and other features, aspects, and advantages of the present invention will become better understood with regard to the following description, claims, and accompanying drawings where:

DETAILED DESCRIPTION OF THE INVENTION

Figure 1:
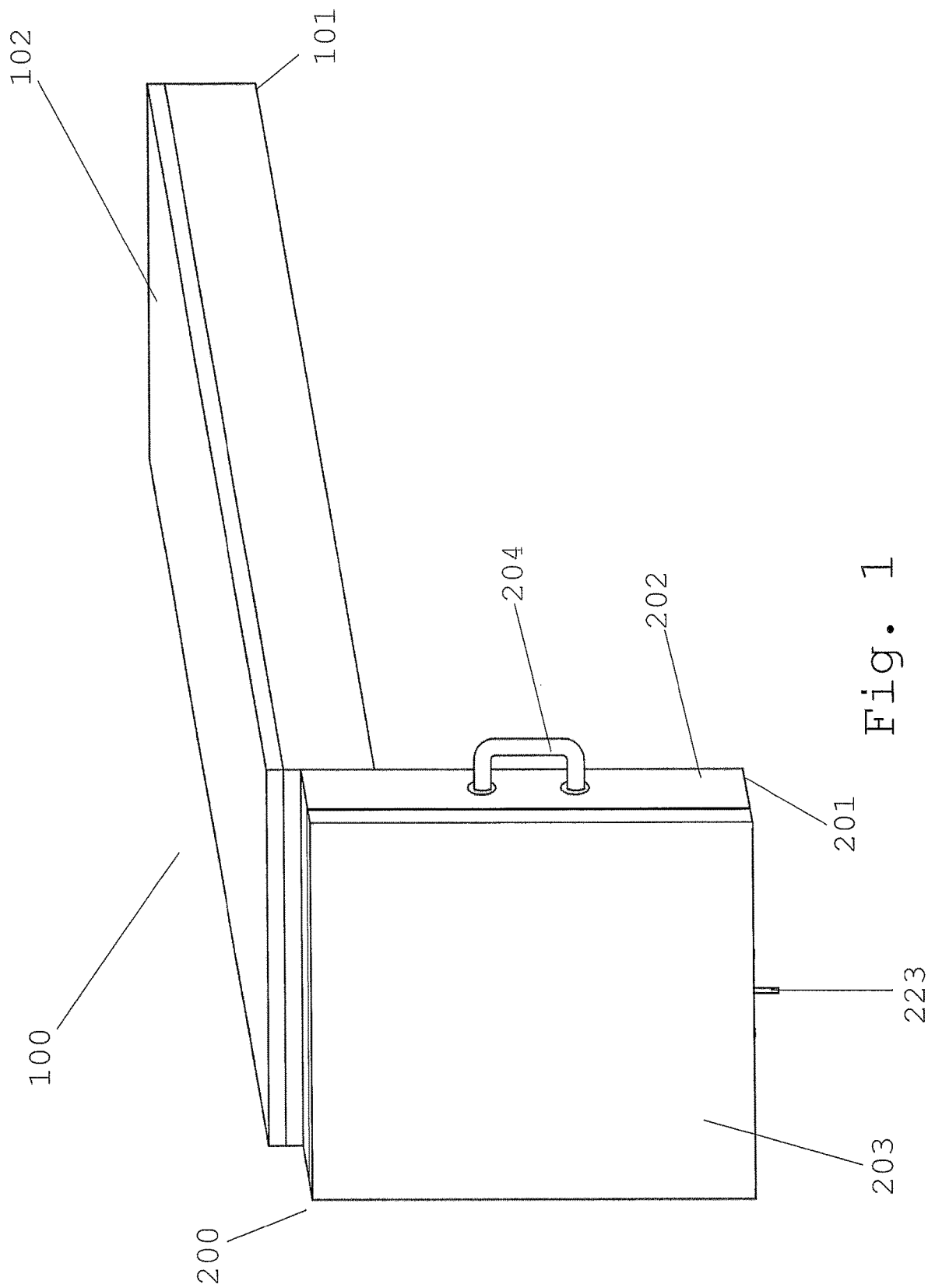
FIG. 1 is an isometric top view of a portable water dispensing system of the present invention.
Figure 2:
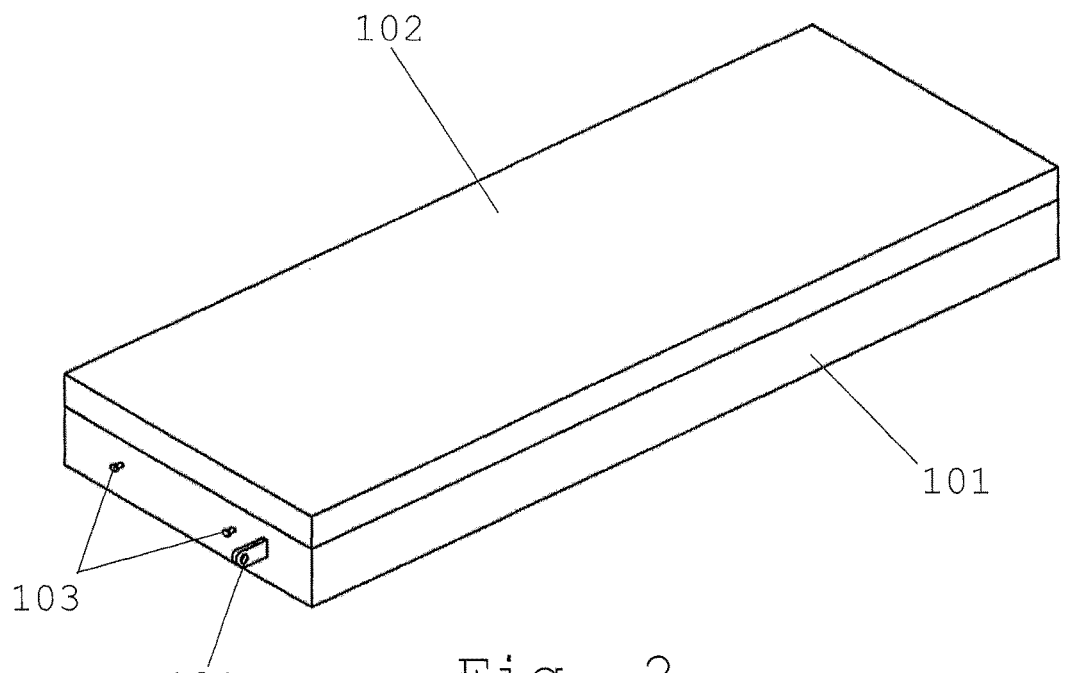
FIG. 2 is an isometric top view of a portable water dispensing system of the present invention.
Figure 3:
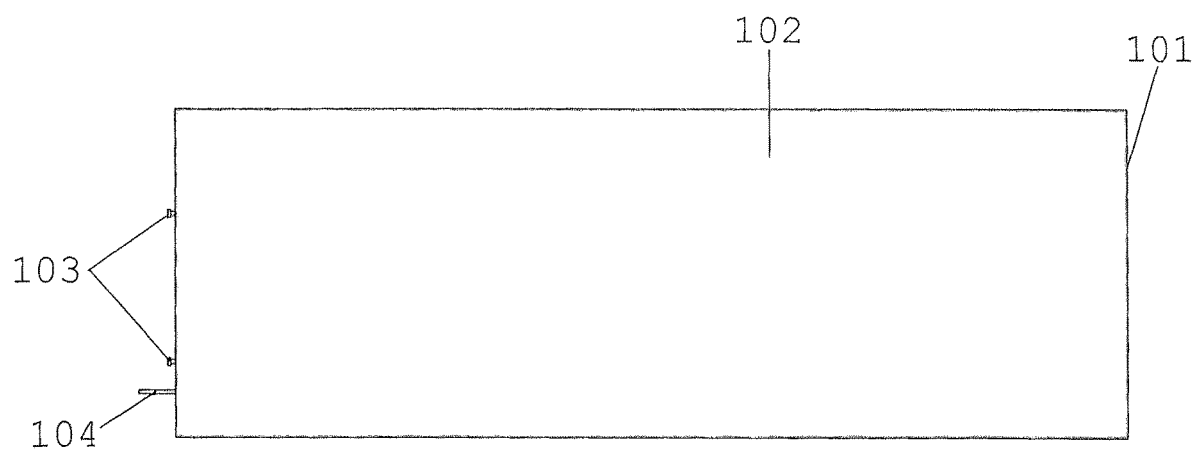
FIG. 3 is a top view of a portable water dispensing system of the present invention.
Figure 4:
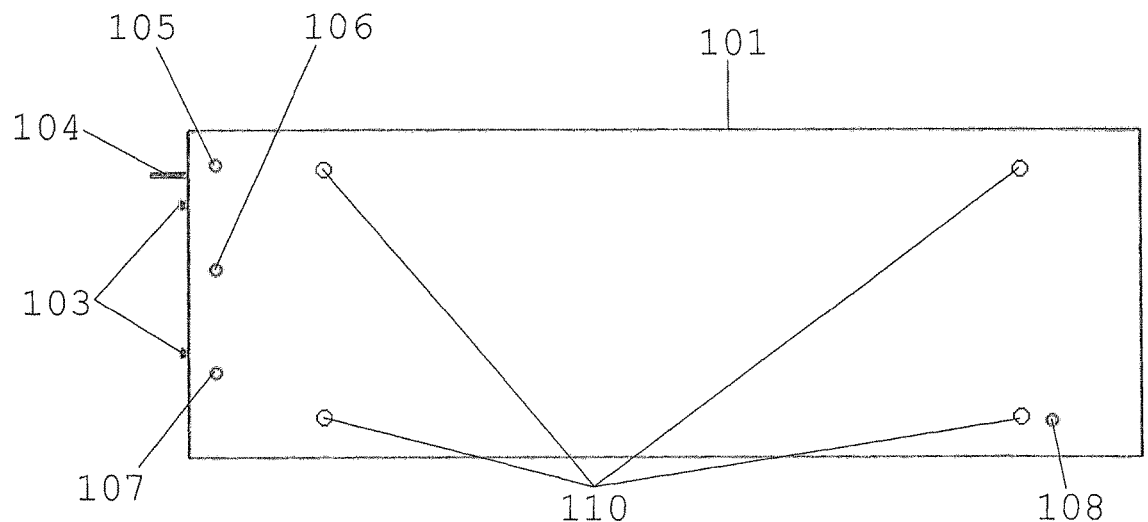
FIG. 4 is a bottom view of a of a portable water dispensing system of the present invention.
Figure 5:
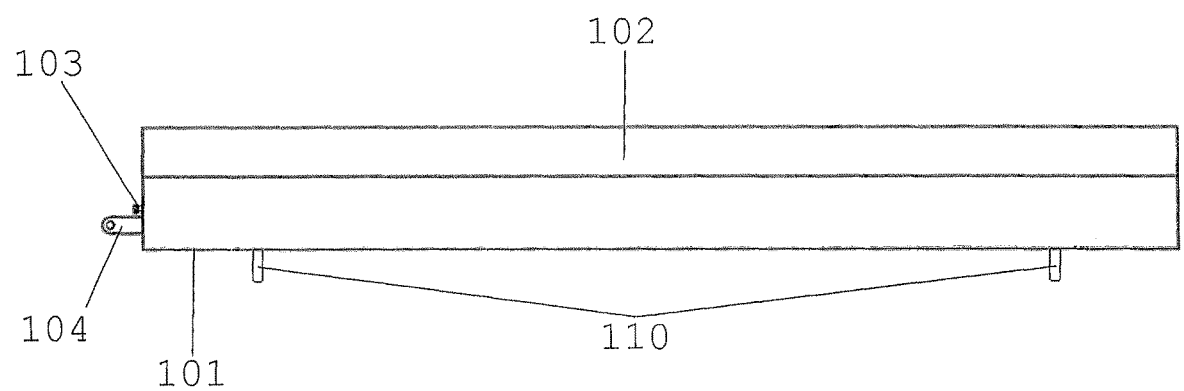
FIG. 5 is a right-side view of a portable water dispensing system of the present invention.

Referring to the drawings, FIGS. 2-7 depict a first embodiment of a portable water dispensing system 100 which has a dispenser case 101, a storage tank assembly 120, and a pump assembly 130.

Referring to the drawings, FIGS. 2-5 depict the exterior of the dispenser case 101. The case 101 takes the general form of a rectangular prism and is preferably made of metal, but plastic or other rigid or semi-rigid material may be used. The dispenser case 101 has a lid 102 which is removably attached to the case 101. The preferred method of attachment is via continuous hinge, but other means of removable attachment known in the art may be used. The case 101 also features multiple mounting studs 103 on the exterior of the case. The mounting studs 103 are preferably shaped such that the end which is not attached to the case is larger than the end which is affixed to the case, similar in profile to a nail which has a head which is larger than the shank. The case 101 also features one or more lock tabs 104 which are preferably located adjacent to one or more of the mounting studs 103. The lock tabs are generally flat in cross-section and protrude perpendicularly from the case 101. In profile, the lock tabs 104 will have parallel sides which extend from the case 101, a rounded end, and a hole proximate the rounded end.

Figure 6:
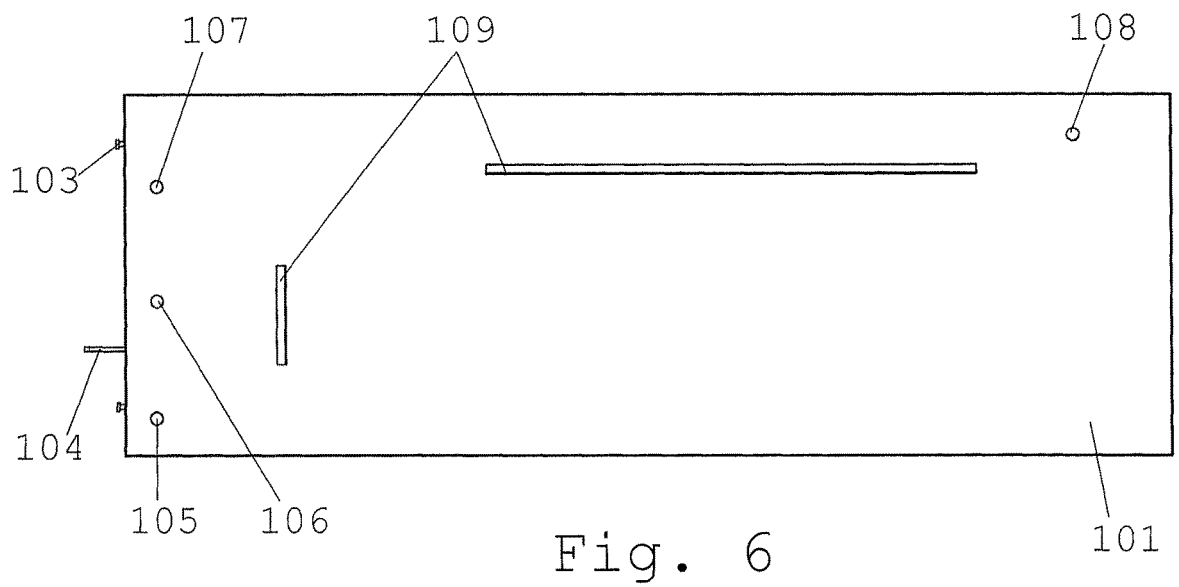
FIG. 6 is a top view of the case with the lid removed.

Referring to the drawings, FIG. 6 depicts the interior of the dispenser case 101. The case 101 features a fill port 105, power connection port 106, water output port 107, and a water vent port 108. The various ports 105-108 are generally configured as round perforations in the case but may take other shapes. The case 101 also features one or more partitions 109 which extend vertically from the bottom of the case 101 into the interior of the case 101. The case 101 also features a plurality of mounting elements 110. The mounting elements 110 are preferably configured as studs which extend from the bottom of the case 101 but may also comprise holes, threaded rods, D-rings, or other known mounting elements in or fixed to the underside of the case 101.

Figure 7:
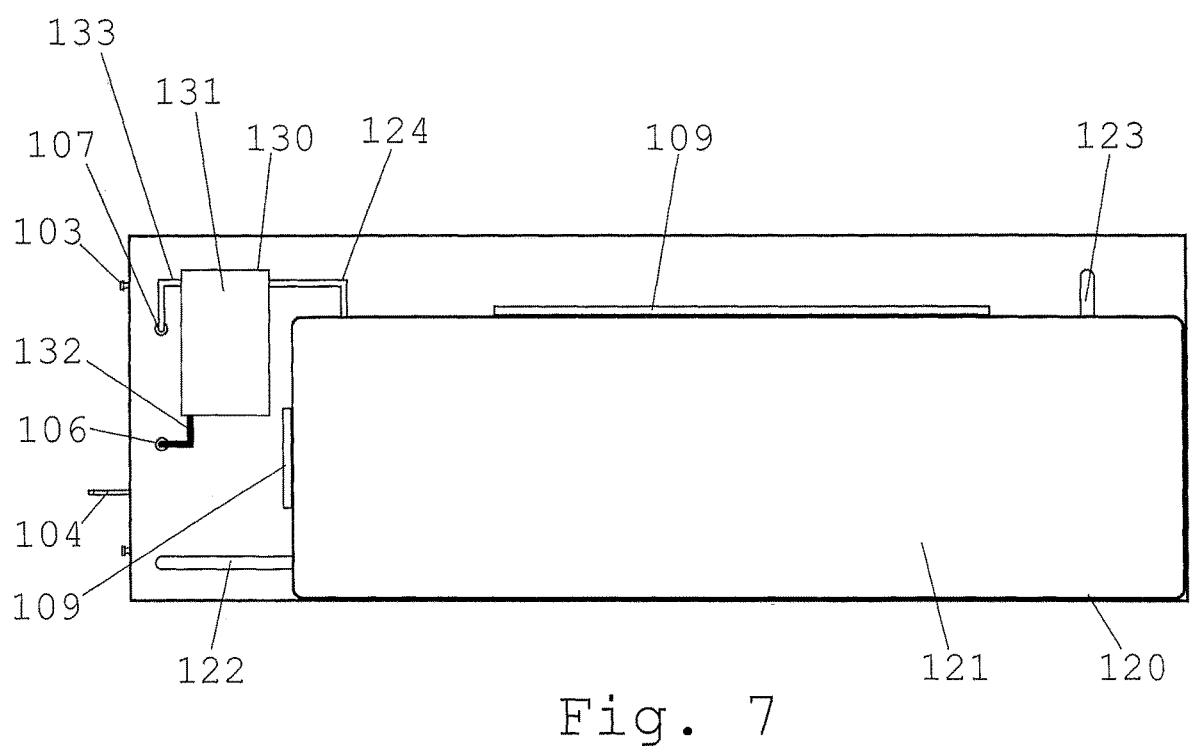
FIG. 7 is a top view of case with the lid removed and the storage tank and pump assemblies installed.

Referring to the drawings, FIG. 7 depicts the storage tank assembly 120. The storage tank assembly comprises a water tank 121, fill line 122, a vent line 123, and an output line 124. The water tank 121 is preferably constructed of rigid plastic, but may also be constructed of other rigid material which is safe for containing potable water; further, the water tank may also be comprise a flexible bladder made of material which is safe for containing potable water. The water tank 121 is situated in the case 101 proximate the partitions 109 such that the tank 121 is bound by the side walls of the case and the partitions 109 as depicted in FIG. 7

The fill line 122 comprises a hose or tube which connects to the water tank 121. The fill line is constructed of material which is safe for potable water. The fill line 122 is attached at one end to the water tank 121 such that liquid may pass through the fill line 122 and into the tank 121. The opposite end of the fill line 122 may feature a fitting for the connection of a water hose and is configured extend from the tank and through the fill port 105 such that it is outside the case.

The vent line 123 comprises a hose or tube which connects to the water tank 121. The fill line is constructed of material which is safe for potable water. The vent line 123 is attached at one end to the water tank 121 such that liquid or air may pass from the tank 121 through the vent line 123. The vent line 123 should connect to the tank 121 on the uppermost part of the tank. The opposite end of the vent line 123 is configured extend from the tank and through the vent port 106 such that it is outside the case.

The output line 124 comprises a hose or tube which connects to the water tank 121. The output line 124 is constructed of material which is safe for potable water. The output line 122 is attached at one end to the water tank 121 such that liquid may pass from the tank 121 through the output line 124. The output line 124 should connect to the lowermost part of the tank. The opposite end of the output line 124 is configured extend from the tank connect to the pump assembly 130.

Referring to the drawings, FIG. 7 depicts the pump assembly 130. The pump assembly 130 comprises a water pump 131, power connection 132, and exit line 133. The water pump 131 is preferably a 12 volt electric pump which is readily available and known in the art. Other pumps which utilize other power sources may also be used. The pump is attached to the case 101 proximate the water tank 121. The power connection 132 is preferably wires which connect to the pump and connect the pump to an electrical power source. The power connection 132 is preferably configured such that it is connected to the pump and runs through the power connection port 106 such that the power connection 132 exits the case 101 so that it may connect to an external power source such a vehicle battery. However, the power connection may remain inside the case 101 if a suitably power source may be found which fits inside the case 101. The exit line 133 comprises a hose or tube which connects to the pump 131. The exit line 133 is constructed of material which is safe for potable water. The output line 124 is attached at one end to the pump 131 such that liquid may pass from the pump 131 through the exit line 133. The opposite end of the exit line 133 is configured extend from the pump 131 and through the water output port 107 such that it is outside the case.

To assemble this embodiment of the portable water dispensing system 100, the storage tank assembly 120 is placed into the case such that the fill line 122 connects to the water tank 121 and passes through the fill port 105, the vent line 123 connects to the water tank 121 and passes through the vent port 106, and the output line 124 connects to the water tank 121 and the pump 131. The pump assembly 130 is placed into the case and configured such that the output line 124 connects to the pump 131, the exit line 133 extends from the pump 131 through the output port 107, and the power connection 132 connects from the pump 131 and extends through power connection port.

To operate this embodiment of the portable water dispensing system 100, water is input through the fill line 122 into the water tank 121. Once the tank 121 is full, water will flow out of the vent line 123 to signify that the tank is full and the water source can be removed. An external power source, such as a 12 volt battery is then applied to the pump 131 via the power connection 132 and water will be pumped from the water tank 121, through the output line 124, into the pump 131, and exit the system 100 through the exit line 133. The user may use the water that is pumped out for any purpose desired and may connect any readily available valve, nozzle, or fitting to the exit line to suit the user's intended purpose.

The portable water dispensing system 100 may also comprise a heating unit 200 configured to warm the water above ambient temperature. The heating unit 200 comprises and enclosure 201 and a water heater assembly 220.

Figure 8:
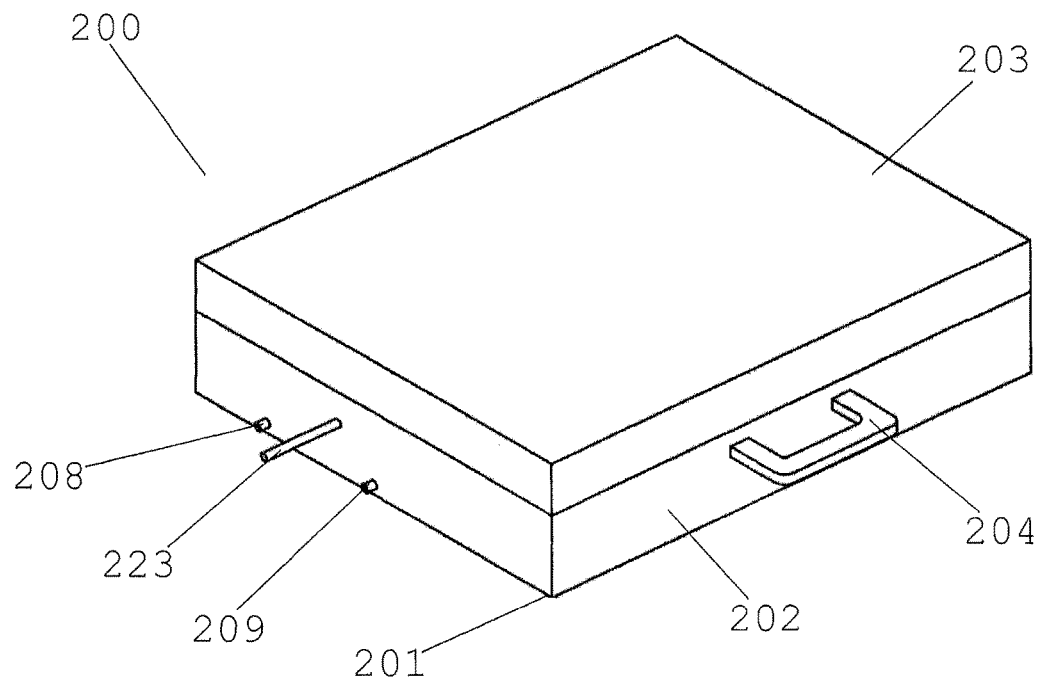
FIG. 8 is a top isometric view of the heating unit.
Figure 9:
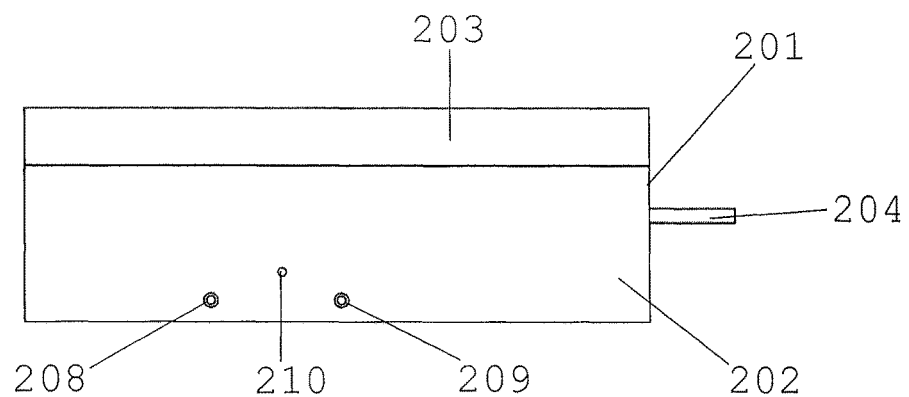
FIG. 9 is a bottom view of the heating unit.
Figure 10:
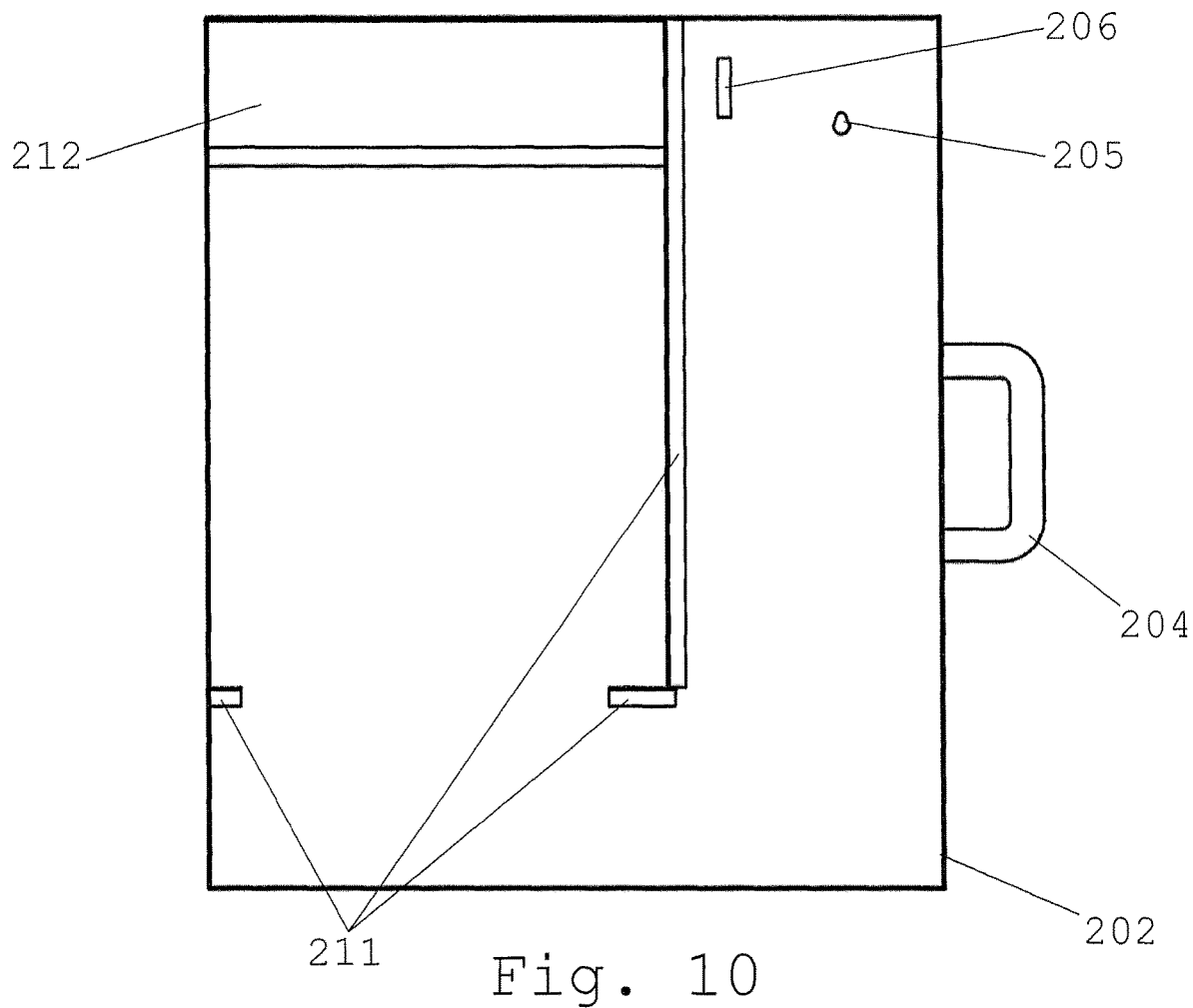
FIG. 10 is a front view of the heating enclosure with the cover removed.

Referring to the drawings, FIGS. 8-9 depict the exterior of the enclosure 201. The enclosure comprises an enclosure body 202 with a removable cover 203. The enclosure 201 takes the general form of a rectangular prism and is preferably made of metal, but plastic or other rigid or semi-rigid material may be used. The enclosure 201 has a cover 203 which is removably attached to the enclosure 201. The preferred method of attachment is via continuous hinge, but other means of removable attachment known in the art may be used. The enclosure 201 also features a carry handle 204 on the exterior of the enclosure body 202. The carry handle 204 is preferably C-shaped such that the ends, of the C are affixed to the enclosure body as depicted in FIG. 8. The carry handle is preferably made of the same material as the enclosure, but may be made of any rigid or semi-rigid material. The enclosure 201 also features a plurality of mounting holes 205 which are located on the back of the enclosure body 202. The mounting holes 205 are preferably keyhole shaped and preferably sized such that the mounting studs 103 will pass through the larger section of the keyhole, but not through the narrower section of the keyhole. The mounting holes are also preferable spaced such that their spacing is equivalent to the spacing of the mounting studs 103 on the case 101. The enclosure 201 also features one or more lock slots 206 which are preferably located adjacent to one or more of the mounting holes 205. The lock slots 206 are generally narrow slots which are punched or cut in the enclosure body 202. The lock slots 206 are preferably sized to be very slightly larger than the lock tabs 104 and configured such that the lock tabs 104 may pass through the lock slots 206. The lock slots 206 are preferably placed on the enclosure body 202, in the same arrangement with the mounting holes 205 as the lock tabs 104 are with the mounting studs 103 on the case 101. Essentially, the mounting holes 205 and lock slots 206 should be arranged to correspond with the arrangement of the mounting studs 103 and lock tabs 104.

Figure 11:
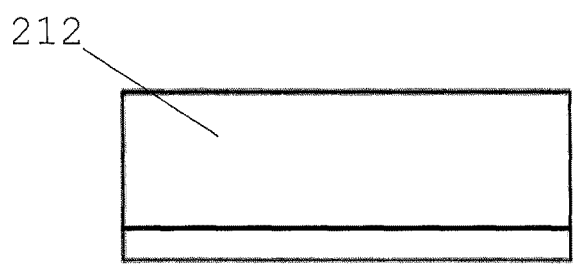
FIG. 11 is a front view of the exhaust deflector.
Figure 12:
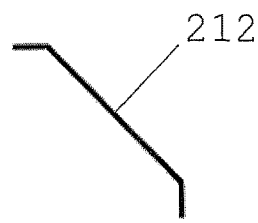
FIG. 12 is a cross sectional view of the exhaust deflector.
Figure 13:
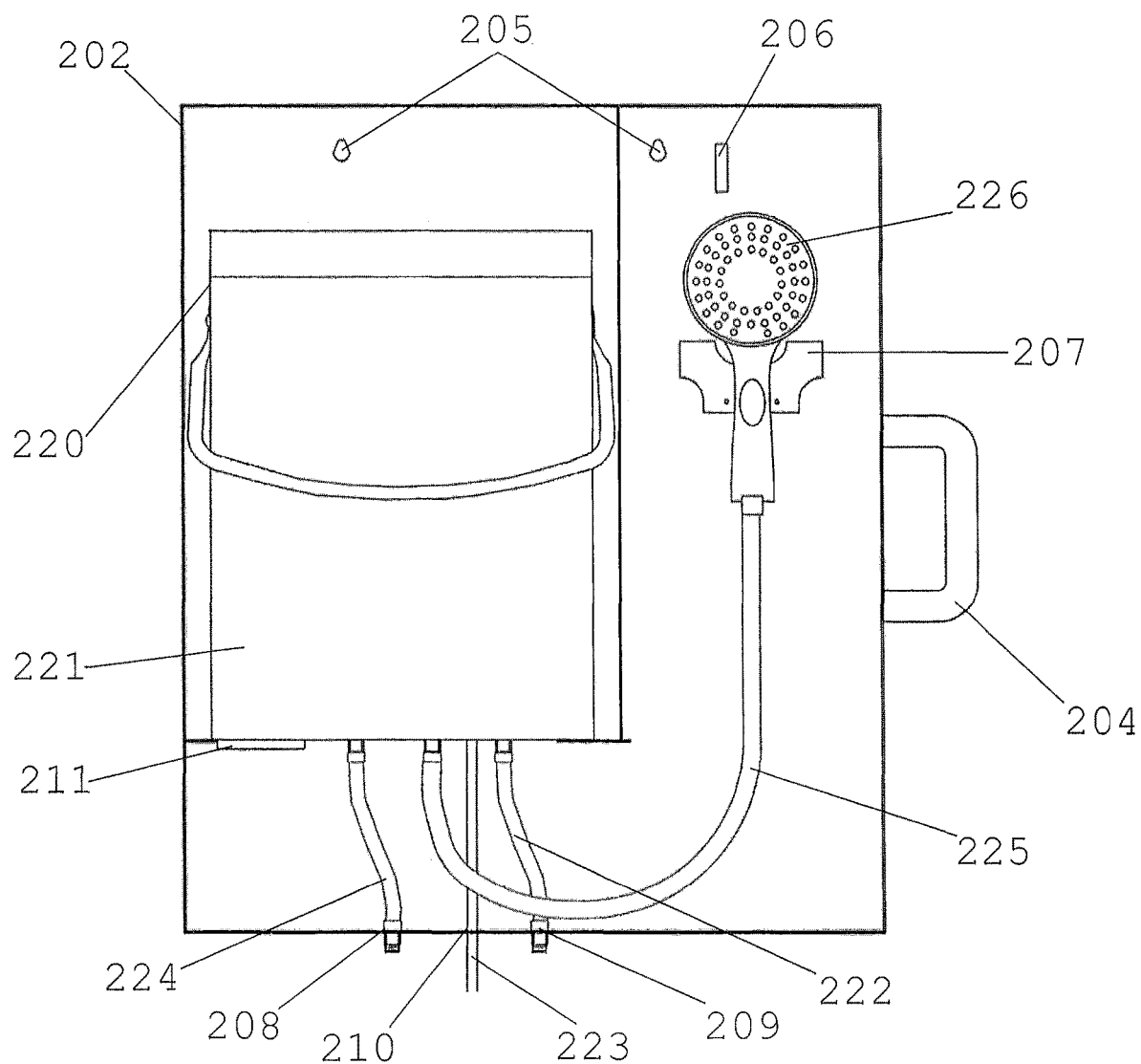
FIG. 13 is a front view of the heating unit with the enclosure cover and exhaust deflector removed and the water heater assembly installed.
Figure 14:
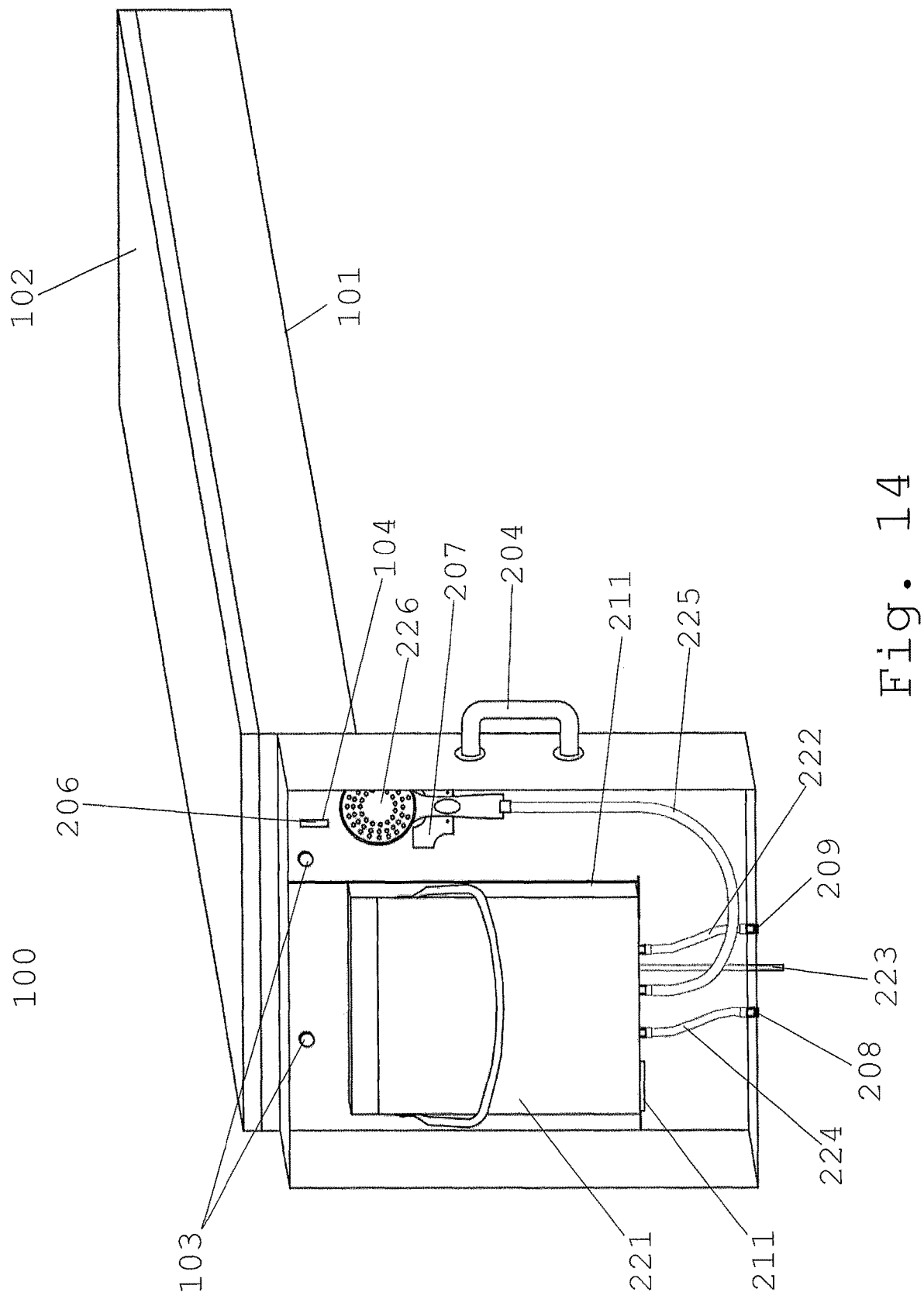
FIG. 14 is an isometric top view of a portable water dispensing system of the present invention with heating unit installed and heating enclosure lid removed

Referring to the drawings, FIGS. 10-14 depict the interior of the enclosure 201. The enclosure body 202 features a bracket 207, an intake port 208, a fuel port 209, and a drain port 210. The enclosure ports 208-210 are generally configured as round perforations in the case but may take other shapes. The enclosure body 202 also features one or more dividers 211 which extend vertically from the back wall of the enclosure body 202 into the interior of the enclosure 201. The enclosure 201 also features a removable exhaust deflector 212. The exhaust deflector 212 is preferably shaped as shown in FIGS. 11-12 and is removably mounted to the interior of the case body 202 as depicted in FIG. 14. The exhaust deflector 212 is preferably made of metal but may also be made of other rigid, non-heat sensitive materials. The bracket 207 is attached to the interior of the enclosure body 201, is preferably made of metal or other rigid material, and is preferably configured as one or more protrusions that form a hook shape. Other configurations such as multi-pronged clamps, D-rings, or other bracket configurations known in the art are also acceptable.

Referring to the drawings, FIGS. 13 and 14 depict the water heater assembly 220 placed in the enclosure 201. The water heater assembly 220 comprises a water heater 221, fuel line 222, drain line 223, intake line 224, and dispenser line 225. The water heater 221 is preferably a portable water heater which is powered by propane or other hydrocarbon fuel which is readily available and known in the art. However, water heaters powered by other sources are also acceptable for use. The fuel line 222 is preferably a tube, which is preferably flexible, but may be rigid or semi-rigid. As the preferred fuels are hydrocarbon, the fuel line 222 is preferred to be constructed such that it may contain the pressure needed to contain and dispense hydrocarbon fuel. In the event of an electrically powered water heater 221, the fuel line 222 would comprise an electrical wire. The fuel line 222 is preferably configured such that it connects to the water heater and passes through the fuel port 209 where it may be connected to a fuel source. The drain line 223 comprises a hose or tube which connects to the water heater 221 which is configured to drain any excess moisture from the water heater 221. The intake line 224 is preferably a tube constructed of material which is safe for potable water. The intake line 224 is attached at one end to the water heater 221 such that liquid may pass from through the intake line 224 and into the water heater 221. The opposite end of the intake line 224 is configured extend from the water heater 221 and through the intake port 208 such that it is outside the case and may be connected to a water supply, which is preferably the exit line 133 of the water dispensing system of this invention. The dispenser line 225 is preferably a flexible tube constructed of material which is safe for potable water. The dispenser line 225 is attached at one end to the water heater 221 such that liquid may pass from the water heater 221 and be dispensed at the opposite end of the dispenser line 225.

The water dispensing system may also feature a nozzle 226. The nozzle preferably comprises a readily available shower head, but may also comprise an on/off valve, spray nozzle, or hose nozzle. The nozzle 226 is preferably connected to the dispenser line 225 of the water heater assembly 220 such that the heated water may be dispensed in a controlled manner. The nozzle is also preferably configured to be placed into the enclosure 201 and removably attached to the bracket 207. The nozzle may also be connected to the exit line 133 and used without the water heater assembly 220

To use the second embodiment of the water dispensing system 100, which further comprises a water heater assembly 220, the user may connect the system's exit line 133 to the intake line 224 of the water heater assembly. Once the lines are connected, the water heater 221 should be connected to a fuel source and activated. Then, the pump 131 should be connected to its power source activated such that water is pumped from the water tank 121, through the pump assembly 130, and into the water heater assembly 220. Heated water will then flow out of the dispenser line 225 for use as desired. The dispenser line 225 may be connected to the nozzle 226 so that the user may control the flow of heated water as desired.

While this invention has been described with the specific embodiments outlines above, the preferred embodiments set forth are intended to be illustrative, not limiting. Various changes may be made without departing from the scope of the invention as defined in the following claims. The claims provide the scope of coverage of this invention and should not be limited to the specific examples cited above.

What is claimed is:

1. A portable water dispensing system comprising:
a dispenser case comprising a lid, a plurality of mounting studs, a lock tab, a fill port, a power connection port, a water output port, a water vent port, a partition, and a plurality of mounting elements;
a storage tank assembly comprising a water tank which is located inside the dispenser case, a fill line which is connected to the water tank and is configured such that the fill line is routed through the fill port, a vent line which is connected to the water tank and is configured such that the vent line is routed through the water vent port, and an output line which is connected to the water tank and is connected to a water pump;
a pump assembly which is located inside the dispenser case comprising the water pump, a power connection which is connected to the water pump and configured such that it is routed through the power connection port, and an exit line which is connected to the water pump and is configured such that the exit line is routed through the water output port; and,
a heating unit comprising:
an enclosure comprising an enclosure body, a removable cover, a carry handle, a plurality of mounting holes, a lock slot, a bracket, an intake port, a fuel port, a drain port, a plurality of dividers, and an exhaust deflector;
a water heater assembly comprising a water heater, a fuel line which connects to the water heater and is configured such that it is routed through the fuel port, a drain line which connects to the water heater and is configured such that it is routed through the drain port, an intake line that connects to the water heater and is configured such that it is routed through the intake port and connects to the exit line, and a dispenser line which is connected to the heater.

2. The portable water dispensing system of claim 1 further comprising a nozzle connected to the dispenser line.

* * * * *